United States Patent [19]

Cooper

[11] 4,274,445
[45] Jun. 23, 1981

[54] PRESSURE BALANCED THREE-WAY TRANSFER VALVE

[75] Inventor: Roydon B. Cooper, Locust Valley, N.Y.

[73] Assignee: Pall Corporation, Glen Cove, N.Y.

[21] Appl. No.: 28,752

[22] Filed: Apr. 10, 1979

[51] Int. Cl.³ ............ F16K 11/18; F16K 35/02; F16K 31/44; B01D 33/00
[52] U.S. Cl. ............... 137/636.1; 137/601; 251/95; 251/104; 251/110; 251/258; 251/282; 210/340
[58] Field of Search ........... 210/340, 90; 137/636, 137/636.1, 601; 251/282, 257, 258, 243, 247, 95, 104, 110

[56] References Cited

U.S. PATENT DOCUMENTS

| 1,752,908 | 4/1930 | Hosel | 137/601 |
|---|---|---|---|
| 1,763,942 | 6/1930 | Baker | 251/257 |
| 2,921,603 | 1/1960 | Lofink | 251/282 |
| 3,116,755 | 1/1964 | McNeal | 137/601 |
| 3,207,183 | 9/1965 | Stuhl | 251/257 |
| 3,403,700 | 10/1968 | Meynell | 137/607 |
| 3,468,344 | 9/1969 | Sanford | 137/607 |
| 3,679,060 | 7/1972 | Smith | 210/340 |
| 3,768,654 | 10/1973 | Pearce | 210/340 |
| 3,770,247 | 1/1973 | Nelson | 251/282 |
| 3,970,109 | 7/1976 | Uerlichs et al. | 137/601 |

Primary Examiner—Alan Cohan
Assistant Examiner—Chambers A. Michael

[57] ABSTRACT

A pressure-balanced three-way transfer valve for controlling fluid flow into one of two fluid lines includes a pair of cam actuated valves actuated by a single actuator to move a respective valve to an open and closed position. Pressure balancing of the valve rods is accomplished by a fluid passage through each of the respective rods to allow lower pressure to a respective balancing chamber. The valves further include respective balancing surfaces.

8 Claims, 12 Drawing Figures

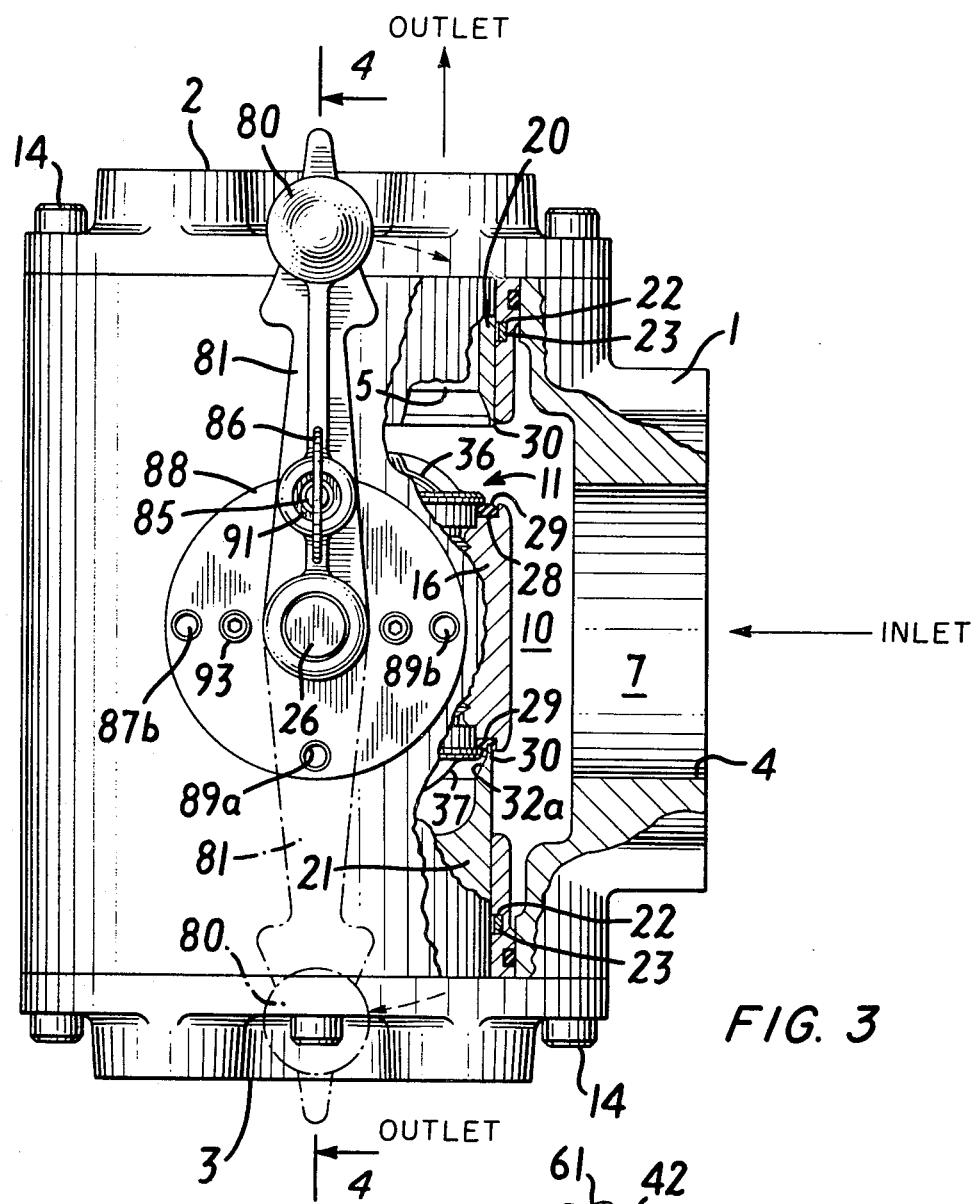
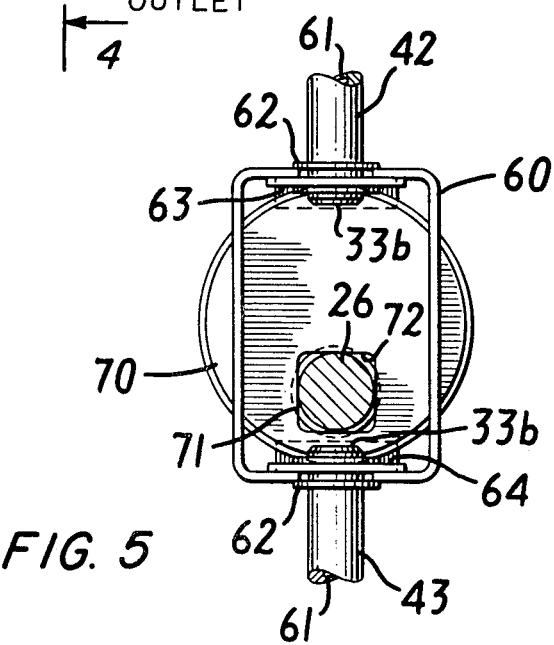
FIG. 3
FIG. 5

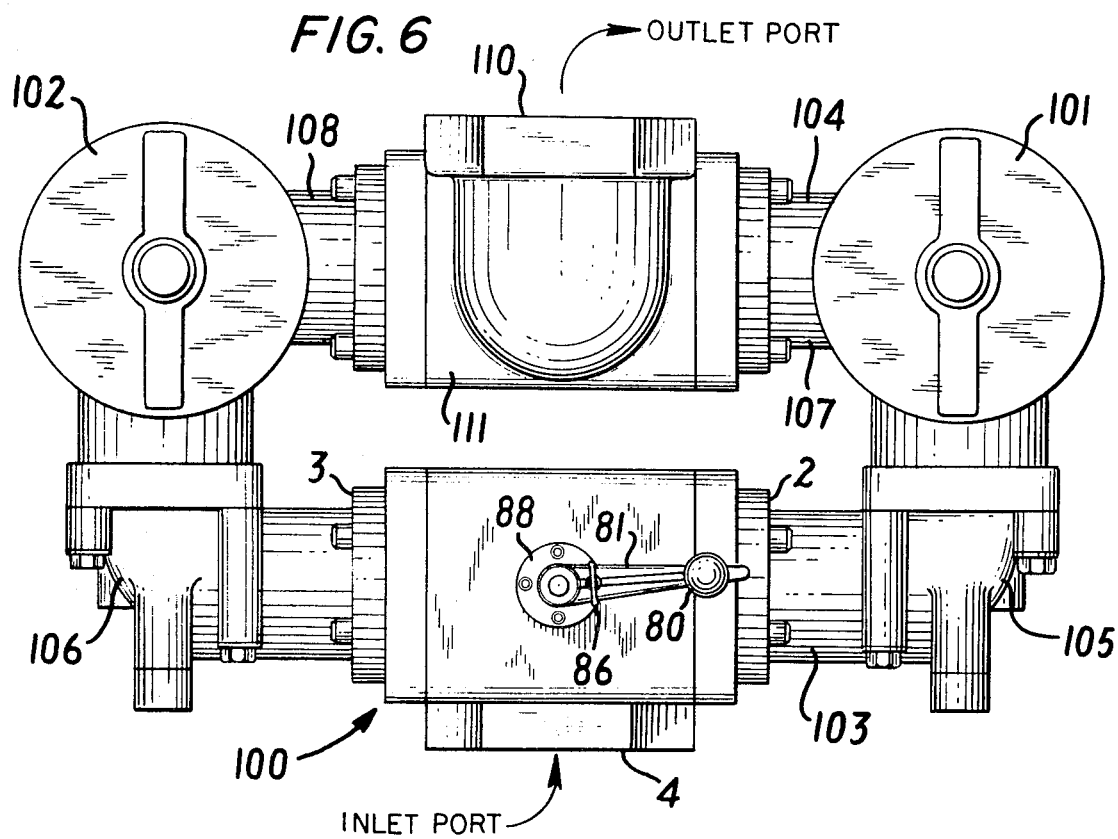
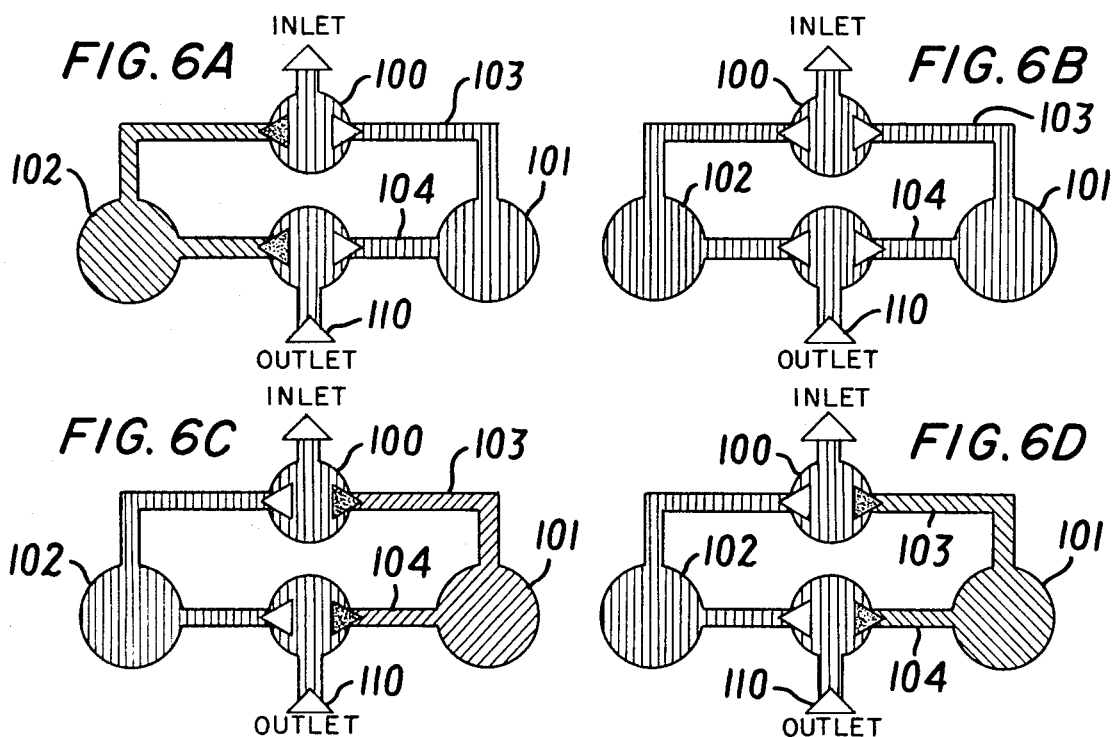
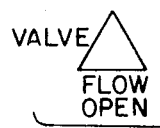  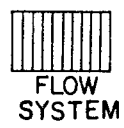  
SYMBOLS FOR FIGURES 6A, 6B, 6C AND 6D.

PRESSURE BALANCED THREE-WAY TRANSFER VALVE

It is frequently necessary in fluid systems to provide a valve which is capable of controlling flow between either of two fluid lines.

Thus, for example, in twin-bed desiccant dryer systems, the gaseous influent must be directed into one bed for adsorption while the other bed is being regenerated, and then, when the bed on the adsorption cycle becomes exhausted, it is necessary to switch the flow to the other bed which has in the meantime been regenerated.

Fluid systems requiring a filtered fluid flow frequently have reserve filters available, to be put on-stream immediately that a filter becomes partially or fully blocked, so as to permit filtered flow to continue while the loaded filter is being serviced or replaced. Reserve filter systems are shown for example in U.S. Pat. No. 3,283,902 to J. A. Farris, et al., patented Nov. 8, 1966; No. 3,262,563 to D. B. Pall, patented July 26, 1966; No. 3,262,564 to D. B. Pall et al, patented July 26, 1966; and No. 3,262,565 to B. F. Silverwater, patented July 26, 1966.

However, the three-way valves provided for use in such systems are not fully satisfactory, particularly when the systems operate under high internal fluid pressure, so that the valve must be switched under conditions where one side of the valve is under high pressure, while the other side of the valve is under relatively low pressure.

Kirkman U.S. Pat. No. 3,783,898, patented Jan. 8, 1974, provides a fluid flow control device having first and second valve means biased normally towards closed positions, and control means for opening the valve means. The control means is operable when the device is connected in a fluid flow path either to displace the first valve means against its bias into an open position, or to displace the second valve means against its bias into an open position. Opening the first valve means permits fluid to flow through the device from an inlet side to an outlet side, while opening of the second flow means permits the venting of the outlet side of the device. The second valve means is also openable independently of the control means, under the action of excess pressure on the outlet side of the device, to relieve the excess pressure.

The two valves provided are of the piston and poppet type, reciprocably connected to a push rod 19, with two spacing collars 22, 23 and a cam 24 located between the collars. The cam 24 is eccentrically mounted on shaft 25, rotated by the handle 26. Movement of the handle 26 to one side or the other of the neutral position causes the shaft 25 to rotate in one or the other direction, so that the cam 24 displaces the push rod 19 to open and close each of the valve means 2 and 3, one valve being closed when the other is open, or both valves being closed, according to the position of the cam. The valve is not designed to operate under high fluid pressure differentials. The intention is for it to function as a control valve for use in inflating and deflating inflatable bags, used for lifting applications, such as for lifting crashed vehicles for rescue purposes.

The shape of the cam 24 is not clearly shown in the drawings. It is described as an eccentric end portion of the shaft 25, which is rotatably mounted in the housing to extend perpendicular to the push rod 19.

Meynell U.S. Pat. No. 3,403,700, patented Oct. 1, 1968, and Sanford U.S. Pat. No. 3,468,344, patented Sept. 23, 1969, show fluid flow control valves with cam actuators, but the cams do not operate a reciprocating linkage between two valves.

In accordance with the invention, a pressure-balanced three-way transfer valve for controlling fluid flow into one or two fluid lines is provided, comprising, in combination:

(1) a housing;
(2) a valve chamber in the housing;
(3) first, second and third fluid flow ports in the housing;
(4) first, second and third fluid flow passages in the housing, intercommunicating the valve chamber with the first, second and third fluid flow ports;
(5) a first valve member in the valve chamber movable between open and closed positions across the first fluid flow passage, and controlling flow through the first fluid flow port;
(6) a second valve member in the valve chamber movable between open and closed positions across the second fluid flow passage, and controlling flow through the second fluid flow port;
(7) first cam-following valve-actuating means in the valve chamber operatively connected to the first valve member;
(8) second cam-following valve actuating means in the valve chamber operatively connected to the second valve member;
(9) a cam in the housing separated from the valve chamber and exposed to a pressure lower than fluid pressure, such as atmospheric pressure; movable between first and second positions and operatively connected with the first and second cam-following valve-actuating means in a manner such that
 (a) with the cam in the first position, the first valve member is open and the second valve member is closed;
 (b) with the cam in the second position, the second valve member is open and the first valve member is closed; and
 (c) with the cam in intermediate positions, both the first and second valve members are open at least partially;
(10) means for moving the cam between the first and second positions, thereby opening and closing the valves;
(11) a first pressure-equalizing chamber defined by the first cam-following valve-actuating means and the first valve chamber;
(12) a second pressure-equalizing chamber defined by the second cam-following valve-actuating means and the second valve member;
(13) a first fluid passage through the first cam-following valve-actuating means intercommunicating the pressure lower than fluid pressure with the first pressure-equalizing chamber;
(14) a second fluid passage through the second cam-following valve-actuating means intercommunicating the pressure lower than fluid pressure with the second pressure-equalizing chamber;
(15) the first and second valve members each having pressure-receiving surfaces exposed to fluid pressure in the valve chamber and opposed pressure-receiving surfaces exposed to pressure lower than fluid pressure in the pressure-equalizing chamber;

(16) the first and second cam-following valve actuating means each having pressure-receiving surfaces exposed to fluid pressure in the valve chamber and opposed pressure-receiving surfaces exposed to pressure lower than fluid pressure; and

(17) the opposed pressure-receiving surfaces of the first and second valve members and first and second cam-following valve-actuating means being of such surface areas that the fluid pressure and lower pressure acting on the opposed pressure-receiving surfaces of the cam-following valve actuating means and the valve members are substantially balanced;

whereby such fluid pressures do not interfere with movement of the first and second valve members.

The first and second valve members and the first and second cam-following valve-actuating means are substantially balanced with respect to the opposed fluid pressures acting upon the pressure-receiving surfaces thereof, whether the valve members are in the open or closed positions. When the valve members are in the closed positions, there are no pressure-receiving surfaces exposed to upstream and downstream fluid pressure giving rise to a force component tending to move the valve members away from the closed position, and the opposed pressure-receiving surfaces of the cam-following valve-actuating means are in balance so that these also have no pressure/force component tending to move them in a valve-opening direction. The same situation prevails when the valve members are in the partially to fully open position. The valve members now have pressure-receiving surfaces exposed to fluid pressure in the valve chamber, but all pressure-receiving surfaces thereof are now exposed to the same fluid pressure in the valve chamber, and are substantially in balance while the valve is in the open position, and again the opposed pressure-receiving surfaces of the cam-following valve-actuating means are in balance with respect to the opposed fluid pressures acting upon them.

In the preferred embodiment shown in the drawings, whatever the position of the valve members, one pressure-receiving surface of the cam-following valve-actuating means is exposed to fluid pressure in the fluid flow passages through the tubular valve members and the opposed pressure-receiving surface is exposed to atmospheric pressure at the cam end thereof, but of course some lower pressure lower than fluid pressure can also prevail. The valve members, whatever the position of the cam-following valve-actuating means, have pressure-receiving surfaces exposed to fluid pressure in the fluid flow passages through the tubular valve members, and the opposed pressure-receiving surfaces are also exposed to the same pressure lower than fluid pressure to which the cam-following valve-actuating means are exposed, so that with appropriately adjusted opposed pressure-receiving surface areas, the two components are substantially balanced.

As a result, as soon as the valve members have moved away from the valve seat, while their pressure-receiving surfaces now become exposed to fluid pressure in the valve chamber, because the pressure-receiving surfaces on the valve members and the cam-following valve-actuating means are substantially balanced, the fluid pressures do not interfere with movement of the valve members onward to their next position.

A further feature of preferred embodiments of the invention is first and second resilient valve seals against which the first and second valve members are seated when in their closed position, and having opposed and separate first, second and third pressure-receiving surfaces; the first being exposed to fluid pressure upstream, the second to fluid pressure downstream, and the third to a pressure lower than fluid pressure, such as atmospheric pressure, contributing to pressure balance, when the valve members are in their closed position.

Valves in accordance with the above give good performance at fluid pressures up to about 1250 psi. As the internal or system fluid pressure increases, however, it will be appreciated that the resulting increasing pressure differential across the valve members when in the closed position increase the difficulties in opening the valves. when the valve is closed, the pressure downstream of the valve is zero. At a pressure differential of 1250 psi and more, the fluid literally bursts past the cracked-open valve, with possible damage to resilient seals and other valve components.

Means also can be provided to automatically vent or drain the fluid line downstream of the closed valve, so as to give access to components of the line, such as a filter, for service or replacement.

In the preferred embodiment, the cam is rotatable through from 180° to 360° between the first and second positions, which are from about 90° to about 270° apart, while the valve members are reciprocable between open and closed positions. The cam-following valve-actuating means must therefore convert rotational motion into reciprocating motion, and consequently take the form of shafts or rods, each attached at one end to the valve means and at the other end to cam followers riding on the surface of the cam. The cam is uniformly circular in circumference, and mounted eccentrically on a camshaft, and the cam-followers are the ends of a cam cage within which and along the sides of which the cam rotates.

In the preferred embodiment, the valve members are each tubular, and arranged along a common axis, controlled by movement of the valve member between open and closed positions, with the fluid flow passage through the center of the valve. This conserves space, makes possible a more compact valve housing, and also facilitates balancing the valve members and cam-operated movement thereof between open and closed positions.

Such a preferred embodiment of the transfer valve of the invention is shown in the drawings, in which FIG. 1 represents a top view, with the cap removed, of one embodiment of transfer valve of the invention;

FIG. 3 represents a side view, partly in section, with parts cut away, of the valve shown in FIG. 1, showing the fluid flow path through the valve, taken along the line 3—3 of FIG. 1, and looking in the direction of the arrows;

FIG. 5 represents a cross-sectional view showing details of the cam structure, taken along the line 5—5 of FIG. 4, and looking in the direction of the arrows;

FIG. 6 represents a plan view of a twin-fitter fluid flow system utilizing the valve shown in FIGS. 1 to 5;

Figure 7:
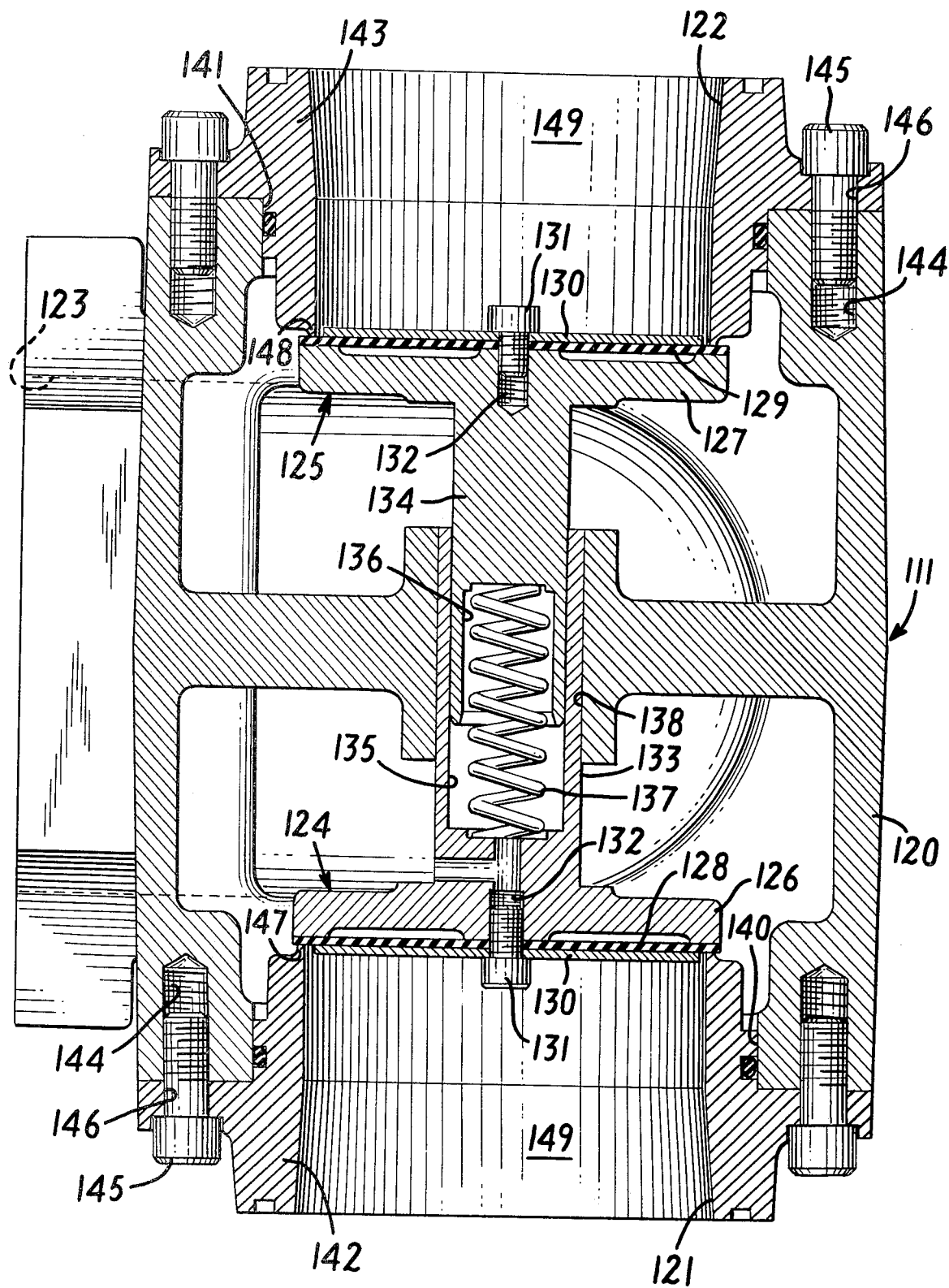

FIGS. 6A to 6D, inclusive, show the sequence of valve positions in the four operating modes of the system of FIG. 6; and FIG. 7 represents a cross-sectional view of the check valve assembly of FIG. 6.

The valve shown in FIGS. 1 to 5 has a housing 1 with three fluid flow ports 2, 3, 4 and interconnecting fluid flow passages 5, 6, 7, respectively. As seen in FIG. 3, each of the fluid passages 5, 6, 7 leads into a central valve chamber 10, which annularly surrounds the central hub 11 of the valve.

The fluid ports 2, 3 are defined by port adaptors 12, 13, respectively, removably attached by cap screws 14 on each side of the housing. The cap screws 14 extend through the apertures 17 of the port adaptors 12, 13, and thread into the threaded bores 15 on opposite sides of the housing.

Each port adaptor 12, 13 has a through cylindrical bore 18, 19 in which is reciprocably slidable one of the coaxial tubular valve members 20, 21, respectively. Thus, the fluid flow passages 5, 6 are in effect the open centers of each tubular valve member 20, 21. In recesses 22 of the bores 18, 19 are provided slipper seals 23, for uniform low-frictional sliding movement of the valve members 20, 21 along the bores 18, 19.

Extending across the central part of the housing and the hub 11 is a cross-bore 25, open at each end, in which is rotatably mounted a cam driveshaft 26. To facilitate rotation, bearings can be provided, but are not necessary, and none are shown. The bore 25 is exposed to a pressure lower than fluid pressure in chamber 10, in this instance, since it is open at each end, to atmospheric pressure.

Figure 1:
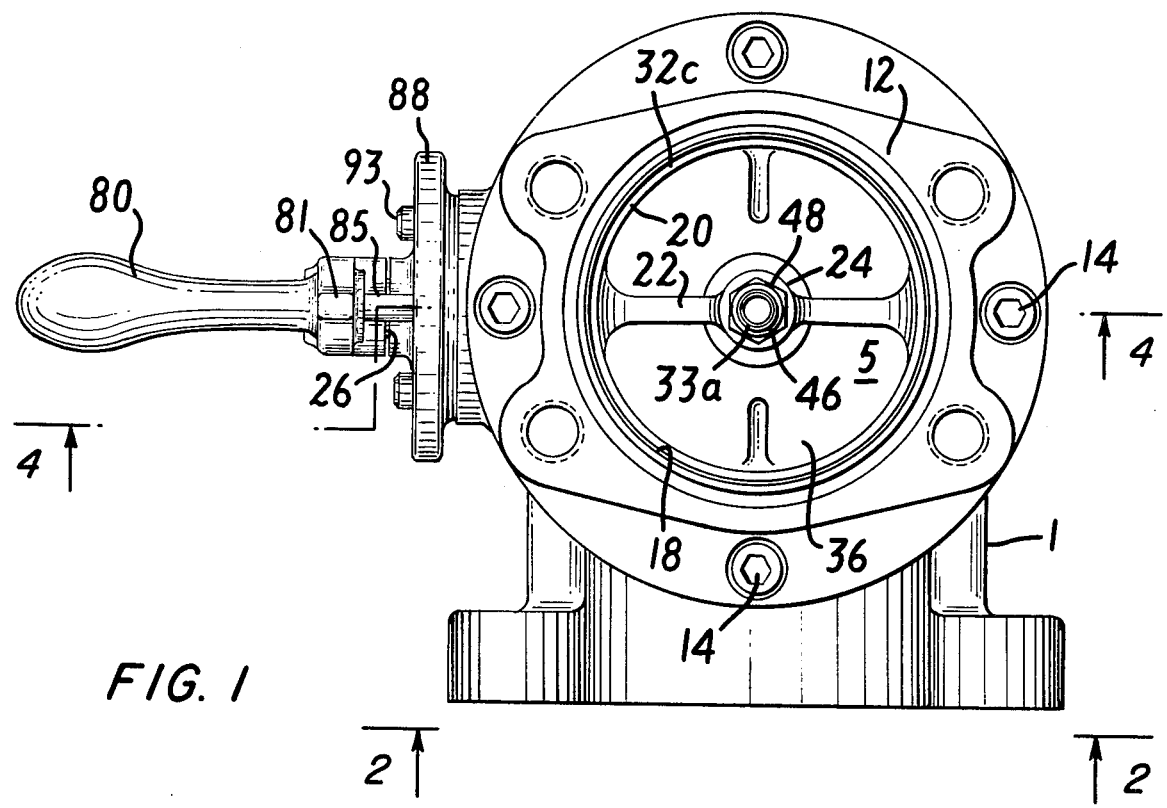
Figure 2:
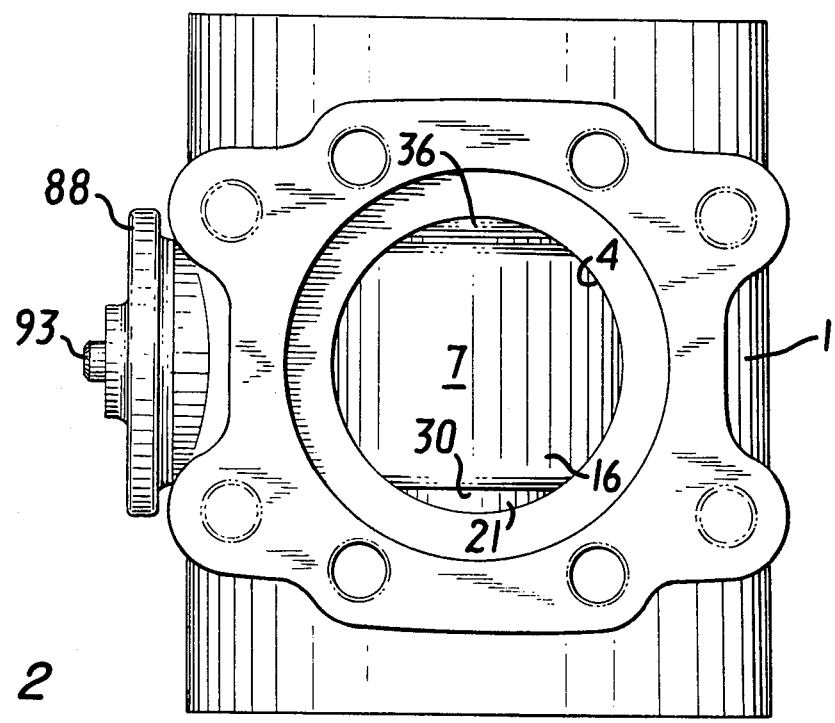
FIG. 2 represents a side view, taken along the line 2—2 of FIG. 1, and looking in the direction of the arrows.
Figure 4:
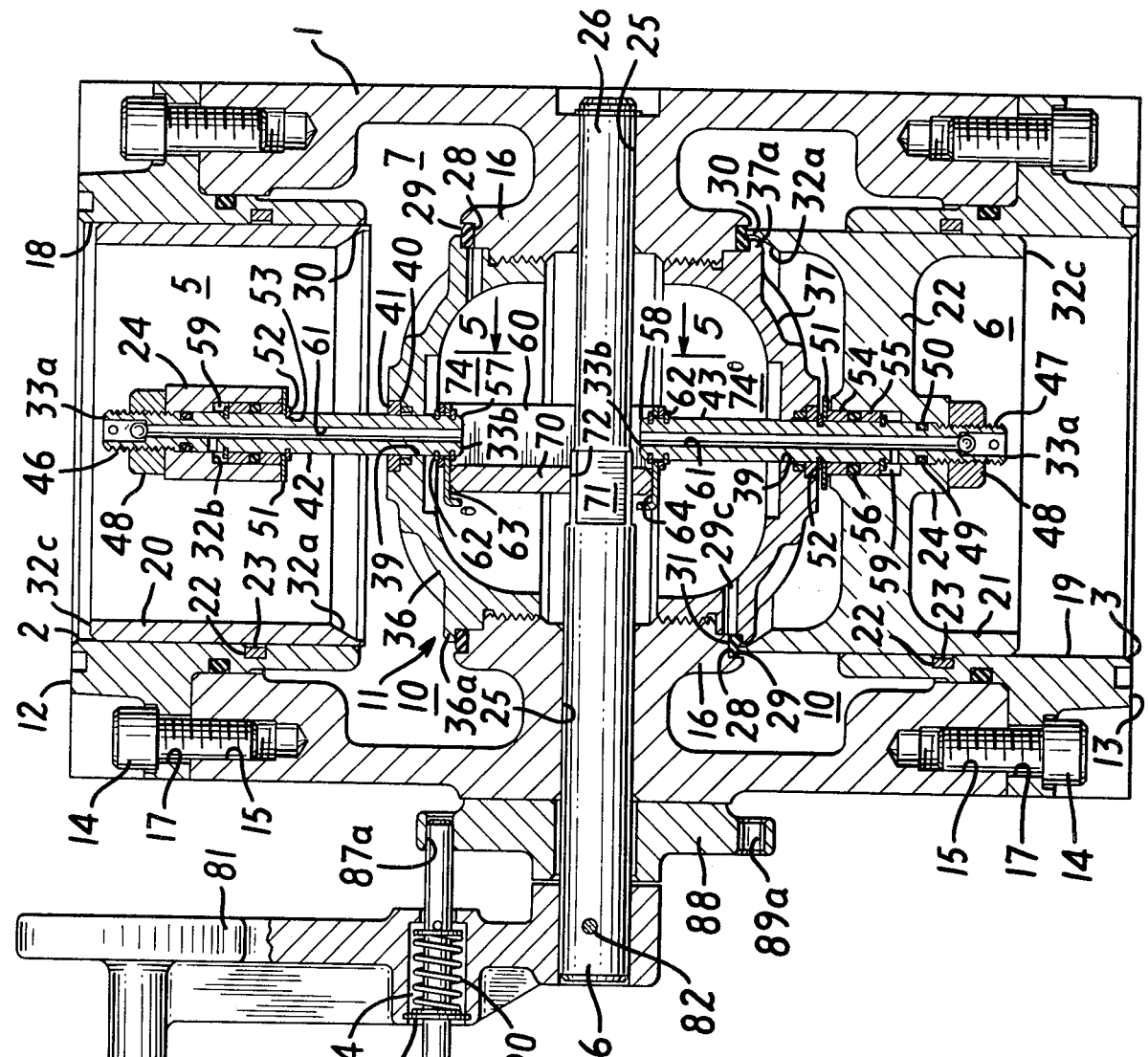
FIG. 4 represents a cross-sectional view, showing details of the valve members, taken along the line 4—4 of FIG. 3, and looking in the direction of the arrows.

As shown in FIG. 4, the valve housing 1 with port adaptors 12, 13 and closures 36, 37 is symmetrical about the axis of the cross-bore 25.

Reentrant portions 16 of the housing 1 on each side of the cross-bore 25 extend inwardly towards the hub 11, as well as outwardly towards the valve members, and are provided with peripheral recesses 28 in which are fitted resilient sealing O-rings 29. The reentrant portions define therebetween a hub chamber 74 open to atmospheric pressure, with two openings communicating with annular valve chamber 10 closed off by the closures 36, 37. The closures, which are circular and slightly dished, have a peripheral flange 36a, 37a, engaging O-ring seals 29 in a leaktight seal, thus sealing off chamber 74 from chamber 10 on both sides of the bore 25.

Figure 4A:
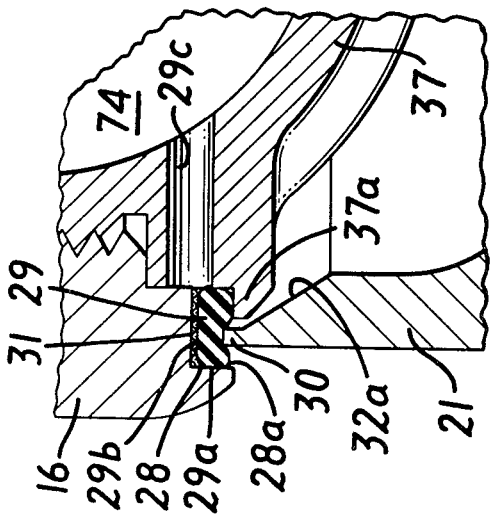
FIG. 4A represents a detail view in cross-section of one valve seat and valve seal of the transfer valve of FIG. 4.

The O-ring seals 29 are also valve seats for the valve members 20, 21. As best seen in FIG. 4A, the sealing tips 30 of the valve members seat against the O-ring 29 when the valves are in a closed position. In FIG. 4 the valve member 20 is shown in the open position, and the valve member 21 in the closed position, with its sealing tip 30 imbedded in the resilient ring 29. With their tips 30 imbedded in O-rings 29, sealingly engaged at their outer peripheries which are also sealingly engaged by slipper seal 23, the valve members 20, 21 are linearly pressure-balanced and chambers 5, 6 can be vented for service without imposing a load on camshaft 26.

The recesses 28 and the O-rings 29 are so shaped that there is a gap 28a between the O-ring face 29a and the sides of the recesses, and a close clearance between that same side of the recess and the tip 30. This is to prevent extrusion of the O-ring when the valve is closed, by subjecting it to upsteam fluid pressure in chamber 10. The flanges 36a, 37a retain the seals 29 in the recess on the other side of the tips 30, and form a leak tight seal against the rings 29.

The face 29b of the seal 29 is prevented from sealing against the closures 36, 37 by the 10$\mu$ screen 31. This ensures that the face 29b is exposed via passage 29c to the lower pressure in the chamber 74 within hub 11, in this case atmospheric pressure communicated via bore 25, which in turn ensures that the O-ring seal 29 will remain in recess 28 even when valve members 20, 21 are in the open position.

Disposed across the chambers 10, 74 through the central portion of the housing 1, transversely to the cross-bore 25, is the cam follower mechanism (best seen in FIGS. 4 and 5) composed of the camshaft 26, cam wheel 70, the cam-following valve-actuating means, the reciprocable connecting rods 42, 43, for moving the tubular valve members 20, 21 between open and closed positions. Each closure 36, 37 has a central aperture 39, through which the connecting rods 42, 43 pass, and provided with recesses 40 receiving slipper seals 41 for uniform low frictional sliding movement of the connecting rods. Thus, the closures 36, 37 support one end of the rods 42, 43.

The other end of each connecting rod 42, 43 extends through the open centers 5, 6, respectively of each valve member 20, 21 into the hubs 24, supported on spokes 22 spanning the open centers and attached to the inside walls of the valve member tubes, which support the other end of the rods for reciprocation with the valve members 20, 21 in the bores 18,19. The rods 42, 43 at their tips 46, 47 threadably receive the lock nut 48. The groove 49 at the outer tip 46, 47 of each connecting rod captures a sealing ring 50. The washers 51 and retaining rings 52 which lock into the grooves 53 on the connecting rods 42, 43 retain the valve members 20, 21 in position on the rods beneath the lock nuts 48. The lock nuts will take up tolerance variations in the valve members and the rods, and so position the valve members precisely in a sealing relationship with resilient seals 29 when in a closed position.

Two pressure-equalizing chambers 59 are defined between valve member 20 and rod 42, and between valve member 21 and rod 43. The chambers 59 are sealed off from the valve chambers 5, 6 by the washers 54, 55 and O-ring 56, fixed in position by the retaining washers 52. The sealing rings can, for example, be of synthetic plastic material, such as Viton A or Buna N, the latter being preferred for water/glycol emulsions and water, oil and petroleum-containing fluid systems.

The inner ends 57, 58 of the connecting rods 42, 43 are locked to the cam cage 60 by the retaining rings 62 on either side of the cage. The rotatable cam wheel 70 mounted on the camshaft 26, as seen in FIG. 5, runs on each inside end wall 63, 64 of the cage 60. It will be noted from FIG. 5 that end wall 63 of the cage 60 is held to the connecting rod 42, and the other end wall 64 of the cage is held to the connecting rod 43. The combination of end wall 63 and rod 42, and the combination of end wall 64 and rod 43, each constitute a cam-following valve-actuating means. Since each of the rods 42, 43 is reciprocable, while the camshaft is rotatable in the cross-bore 25 of the housing, and the cam wheel 70 is eccentrically keyed to the shaft on the squared portion 71 at the key aperture 72, for rotation with the camshaft, it is apparent that rotation of the camshaft rotating the cam wheel 70 along the end walls 63, 64 of cage 60 reciprocates the rods 42, 43 from one side to the other of the hub chamber 74 enclosed by the caps 36, 37, with the result that the valve members are moved between the position shown in FIG. 4 and the exact opposite position, with the cam wheel 70 on the other side of the chamber 74, and the valve member 21 open, and the other valve member 20 closed.

Each valve member 20, 21 has pressure-receiving surfaces 32a exposed to system fluid pressure in valve chambers 5, 6 and pressure-receiving surfaces 32b in pressure equalizing chamber 59 exposed to atmospheric pressure by passages 61 through the cam-following connecting rods 42, 43. In addition, each of the cam-following connecting rods 42, 43 has pressure-receiving surfaces 33a exposed to system fluid pressure in valve chambers 5, 6 and pressure-receiving surfaces 33b exposed oppositely to atmospheric pressure in chamber 74. The surfaces 32, 33 are of such area as to balance the pressures on valve members 20, 21 against the pressures on the cam-following connecting rods 42, 43.

Each of the valve members is also equally balanced with respect to upstream and downstream fluid pressure, having surfaces 32c exposed to downstream fluid pressure and of substantially equal surface area with surfaces 32a.

The camshaft 26 is manually rotated by the handle 80, which is fixed to the lever 81, and this in turn is fixed to the camshaft 26 by the roll pin 82. If desired, a motor drive means can be provided for rotation of the camshaft, linking it, for example, via a set of gears to an electric motor, but since the valve members are pressure-balanced, manual rotation is in fact not difficult.

Means is also provided for locking the camshaft 26 in one of its two limiting positions, in which the valve member 20 and the valve member 21 are closed and open, respectively, and in which the valve member 20 and the valve member 21 are open and closed, respectively. This means is a mechanical detent 85, which has a pivotable grip ring 86 at one end, and at the tip end engages the socket 87a of the valve cap 88, fixed to the housing 1 by screws 93.

There are four sockets in cap 88, as shown in FIG. 3, 87a for locking the camshaft 26 in the position in FIG. 4 when the detent is in the position shown, and 89a for locking the camshaft 26 in the opposite position, with the valve member 21 open and the valve member 20 closed. The two additional sockets 87b and 89b lock the camshaft in positions intermediate these, for retaining both valves open, to equalize pressure across the opening valve.

Another socket 84 in the lever 81 carries a compression spring 90 which is captured therein by the retaining ring 91, and which urges the detent tip into the sockets 87, 89, so as to retain it in the locked position. However, the detent tip is readily removed from the sockets and the camshaft 26 released by simply pulling it out, using the gripping ring 86.

A twin-filter fluid system in which the valve of FIGS. 1 to 5 can be used is shown in FIG. 6, in which the valve is designated 100. The system includes two filter units 101, 102, interconnected at the inlet side by way of the inlet manifold 103, and interconnected at the outlet side by way of the outlet manifold 104. The valve of FIGS. 1 to 5 as shown is inserted in the inlet manifold, controlling flow from the inlet port 4 thereof to one of the two outlet ports 2, 3 thereof and thus to one of the two filters 101, 102 at a time. If it be assumed that with the valve in a position to direct flow into the filter 101 via port 2 while filter 102 is offstream for service or replacement, fluid flow proceeds from port 2 by way of the inlet manifold 103 and passageway 105 into the inlet side of the filter 101, leaving the filter via the outlet passage 107 of the outlet manifold 104 and then to the outlet port 110.

If now filter 101 requires servicing, it has to be shut out of the system and filter 102 put on-stream. This is done in the sequence of steps shown in FIGS. 6A, 6B, 6C and 6D.

FIG. 6A shows the position of the valve with filter 101 on-stream and filter 102 offstream. The forces on the valve members are in balance.

First, the grip ring 86 is pulled out of socket 89a, and the handle 80 and lever 81 moved to place the detent in socket 89b. Now, both valve members 20, 21 are partially open, as seen in FIG. 6B, and pressure equalization can take place. Initially, the pressures are unbalanced, but they quickly equalize.

Then, the grip ring is grasped to withdraw the detent from socket 89b and move it to 87, so that valve 21 is closed and valve 20 is open. The circuit now is as shown in FIG. 6C.

Now, the circuit via filter 101 can be vented and the filter 101 serviced. The circuit is as shown in FIG. 6D.

The cycle can then be repeated.

In order to prevent backflow into the outlet port of whichever of filters 101, 102 is being serviced, a check valve assembly 111 is provided, controlling flow through the outlet port. Details of this check valve are shown in FIG. 7.

The check valve 111 is carried on its own housing 120, with two inlet ports 121, 122 and one outlet port 123. Each inlet port 121, 122 is provided with its own check valve member 124, 125, respectively, which are linked telescopically in the manner shown in FIG. 7. Each valve member has a circular plate 126, 127 at one end, carrying a resilient gasket 128, 129, retained against the plate 126, 127 by a retaining plate 130, the two being held against the valve plate 126, 127 by the retaining screws 131, which thread into the threaded sockets 132 of the valve members 124, 125. The valve plates 126, 127 are each carried on or integral with one end of a cylindrical shaft 133, 134, each with a central bore 135, 136 receiving one end of a compression spring 137. The shaft 134 telescopes into the bore 135 of shaft 133, which in turn is slidable in the central bore 138 of the housing 111.

The housing 111 as seen in FIG. 7 has two outer bores 140, 141 which receive the port adaptors 142, 143, and a number of threaded sockets 144 receiving the cap screws 145 which pass through the apertures 146 of the adaptors 142, 143, and attach the adaptors to each side of the housing 111. Each adaptor 142, 143 has a central aperture 146 defining the inlet ports 121, 122 of the housing 111 and the inner end 147, 148 of each cap at the periphery of the bore defines a valve seat receiving and sealing against the resilient valve gaskets 128, 129.

Inasmuch as the spring 137 is a compression spring, each valve member 124, 125 is resiliently held against the valve seat 147, 148 in a normally closed position. However, upon a sufficient differential of fluid pressure across either valve seat between fluid pressure in the inlet port 121 or 122 and downstream fluid pressure at outlet port 123 exceeding a predetermined minimum, reflected in the compressive resistance of the spring, the valve member 124 or 125 will be reciprocated away from its seat, moving telescopically with respect to the other, and opening its fluid flow passage into communication with the outlet port 123.

When, however, the transfer valve 100 is moved into the opposite position, so that fluid flow now proceeds via the inlet manifold 103 through filter 102, the flow in the outlet manifold 104, now proceeding via outlet passage 108, will result in the communication of a sufficient fluid pressure to the check valve 125 to open the valve, while of course the other check valve 124 will move into the closed position immediately that the filter 101 has been taken offstream, and fluid flow in the line to the inlet port 121 reduced to zero. Thus, the response of the check valve automatically ensures that fluid flow will proceed through the outlet port 123 from whichever of the two outlet flow passages 107, 108 is carrying the filtered flow from the filters 101, 102.

The transfer valves of the invention are particularly adapted for use in fluid systems to control flow through twin filter assemblies or other functions that require servicing or replacement from time to time, permitting continued flow through one function while putting the other function off stream.

The transfer valve of the invention can be made of any suitable materials, such as plastic or metal. Stainless steel is a particularly durable material of construction, suitable for most uses, especially in filter elements, because of resistance to attack by fluids, and is preferred both for the valve element and for the tubular valve housing and other components of the coaxial valve. It is, however, also suitable to make the transfer valve of plastic, such as polytetrafluoroethylene, nylon, polycarbonates, phenolformaldehyde, ureaformaldehyde, or melamine-formaldehyde resins. It is also suitable to fabricate the valve housing and valve elements of stainless steel and interpose a durable plastic sleeve or insert therebetween as a track, such as, for example, polytetrafluoroethylene or nylon.

Having regard to the foregoing disclosure, the following is claimed as patentable and inventive embodiments thereof:

1. A pressure-balanced three-way transfer valve for controlling fluid flow into one of two fluid lines, comprising, in combination:
   (1) a housing;
   (2) a valve chamber in the housing;
   (3) first, second and third fluid flow ports in the housing;
   (4) first, second and third fluid flow passages in the housing, intercommunicating the valve chamber with the first, second and third fluid flow ports;
   (5) a first valve member in the valve chamber movable between open and closed positions across the first fluid flow passage, and controlling flow through the first fluid flow port;
   (6) a second valve member in the valve chamber movable between open and closed positions across the second fluid flow passage, and controlling flow through the second fluid flow port;
   (7) first cam-following valve-actuating means in the valve chamber operatively connected to the first valve member;
   (8) second cam-following valve-actuating means in the valve chamber operatively connected to the second valve member;
   (9) a cam in the housing separated from the valve chamber and exposed to a pressure lower than fluid pressure; movable between first and second positions and operatively connected with the first and second cam-following valve-actuating means in a manner such that
   (a) with the cam in the first position, the first valve member is open and the second valve member is closed;
   (b) with the cam in the second position, the second valve member is open and the first valve member is closed; and
   (c) with the cam in intermediate positions, both the first and second valve members are open at least partially;
   (10) means for moving the cam between the first and second positions, thereby opening and closing the valves;
   (11) a first pressure-equalizing chamber defined by the first cam-following valve-actuating means and the first valve member;
   (12) a second pressure-equalizing chamber defined by the second cam-following valve-actuating means and the second valve member;
   (13) a first fluid passage through the first cam-following valve-actuating means intercommunicating the pressure lower than fluid pressure with the first pressure-equalizing chamber;
   (14) a second fluid passage through the second cam-following valve-actuating means intercommunicating the pressure lower than fluid pressure with the second pressure-equalizing chamber;
   (15) the first and second valve members each having pressure-receiving surfaces exposed to fluid pressure in the valve chamber and opposed pressure-receiving surfaces exposed to a pressure lower than fluid pressure in the pressure-equalizing chamber;
   (16) the first and second cam-following valve-actuating means each having pressure-receiving surfaces exposed to fluid pressure in the valve chamber and opposed pressure-receiving surfaces exposed to pressure lower than fluid pressure; and
   (17) the opposed pressure-receiving surfaces of the first and second valve members and first and second cam-following valve-actuating means being of such surface areas that the fluid pressure and lower pressure acting on the opposing pressure-receiving surfaces of the cam-following valve actuating means and valve members are substantially balanced;
whereby such fluid pressures do not interfere with movement of the first and second valve members.

2. A pressure-balanced three-way transfer valve according to claim 1 comprising first and second resilient valve seals against which the first and second valve members are seated when in their closed position, and having opposed and separate first, second and third pressure-receiving surfaces, the first being exposed to fluid pressure upstream, the second to fluid pressure downstream, and the third to a pressure lower than fluid pressure, such as atmospheric pressure, contributing to pressure balance when the valve members are in their closed position.

3. A pressure-balanced three-way transfer valve according to claim 1 comprising means for removing fluid from the fluid line downstream of the closed valve so as to give access to components of the line for service.

4. A pressure-balanced three-way transfer valve according to claim 1 in which the cam is rotatable through from 180° to 360° between the first and second positions, which are from about 90° to about 270° apart, while the valve members are reciprocable between open and closed positions.

5. A pressure-balanced three-way transfer valve according to claim 1 in which the cam-following valve-actuating means converts rotational motion into reciprocating motion, and comprises a pair of shafts, each attached at one end to the valve means and at the other end to cam followers riding on the surface of the cam.

6. A pressure-balanced three-way transfer valve according to claim 1 in which the cam is uniformly circular in circumference, and mounted eccentrically on a camshaft, and the cam followers are the ends of a cam cage within which and along the sides of which the cam rotates.

7. A pressure-balanced three-way transfer valve according to claim 1 in which the valve elements are each tubular, and the fluid flow passage to the fluid flow port controlled by the valve is defined by the open center of the valve tube.

8. A pressure-balanced three-way transfer valve according to claim 7 in which the tubular valve elements are coaxial.

* * * * *

UNITED STATES PATENT AND TRADEMARK OFFICE
CERTIFICATE OF CORRECTION

PATENT NO. : 4,274,445
DATED : June 23, 1981
INVENTOR(S) : Roydon B. Cooper

It is certified that error appears in the above—identified patent and that said Letters Patent is hereby corrected as shown below:

Column 4, line 67 : "fitter" should be --filter--

Column 7, line 41 : insert --shown-- following "position"

Column 8, line 53 : "146" should be --149--

Column 9, line 14 : insert --fluid-- following "filtered"

Signed and Sealed this

Third Day of August 1982

[SEAL]

Attest:

GERALD J. MOSSINGHOFF

*Attesting Officer*  *Commissioner of Patents and Trademarks*